US012614786B2

(12) United States Patent
Maeda

(10) Patent No.: US 12,614,786 B2
(45) Date of Patent: Apr. 28, 2026

(54) BATTERY CASE AND BATTERY

(71) Applicant: TOYOTA JIDOSHA KABUSHIKI KAISHA, Toyota (JP)

(72) Inventor: Takamasa Maeda, Oobu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 630 days.

(21) Appl. No.: 18/051,062

(22) Filed: Oct. 31, 2022

(65) Prior Publication Data

US 2023/0142994 A1     May 11, 2023

(30) Foreign Application Priority Data

Nov. 9, 2021     (JP) ................................. 2021-182276

(51) Int. Cl.
H01M 50/103         (2021.01)
(52) U.S. Cl.
CPC ................................ H01M 50/103 (2021.01)
(58) Field of Classification Search
CPC ................................................. H01M 50/103
See application file for complete search history.

(56) References Cited

U.S. PATENT DOCUMENTS

2009/0269654 A1    10/2009  Kairawicz et al.
2019/0312237 A1*   10/2019  Moon ................... H01M 10/52
2023/0142994 A1     5/2023  Maeda

FOREIGN PATENT DOCUMENTS

| JP | S58-16139 | † | 4/1983 |
| JP | 2009181897 | A | 8/2009 |
| JP | 2011520222 | A | 7/2011 |
| JP | 2011253763 | A | 12/2011 |
| JP | 2014216307 | A | 11/2014 |
| JP | 2018-139188 | † | 9/2018 |
| JP | 2018139188 | A | 9/2018 |
| JP | 2023070239 | A | 5/2023 |

* cited by examiner
† cited by third party

*Primary Examiner* — Jane J Rhee
(74) *Attorney, Agent, or Firm* — Dickinson Wright, PLLC

(57)          ABSTRACT

A main object of the present disclosure is to provide a battery case with which excellent volume density is obtained. The present disclosure achieves the object by providing a battery case for storing an electrode body, the battery case including: a hollow structure; the hollow structure includes a first surface, a second surface facing the first surface, a third surface connecting the first surface and the second surface, and a fourth surface facing the third surface; and in a side view of an axis direction of the hollow structure, when $B_1$ designates a boarder part between the third surface and the first surface, $B_2$ designates a boarder part between the third surface and the second surface, and $L_{12}$ designates a line segment connecting the $B_1$ and the $B_2$, the third surface includes a convex structure of which top is positioned closer to the fourth surface side compared to the $L_{12}$.

15 Claims, 6 Drawing Sheets

FIG. 10
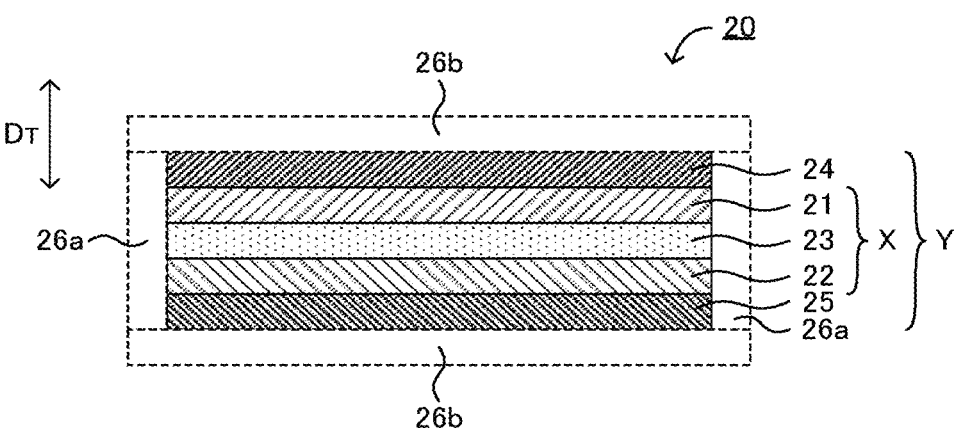
FIG. 11A
FIG. 11B
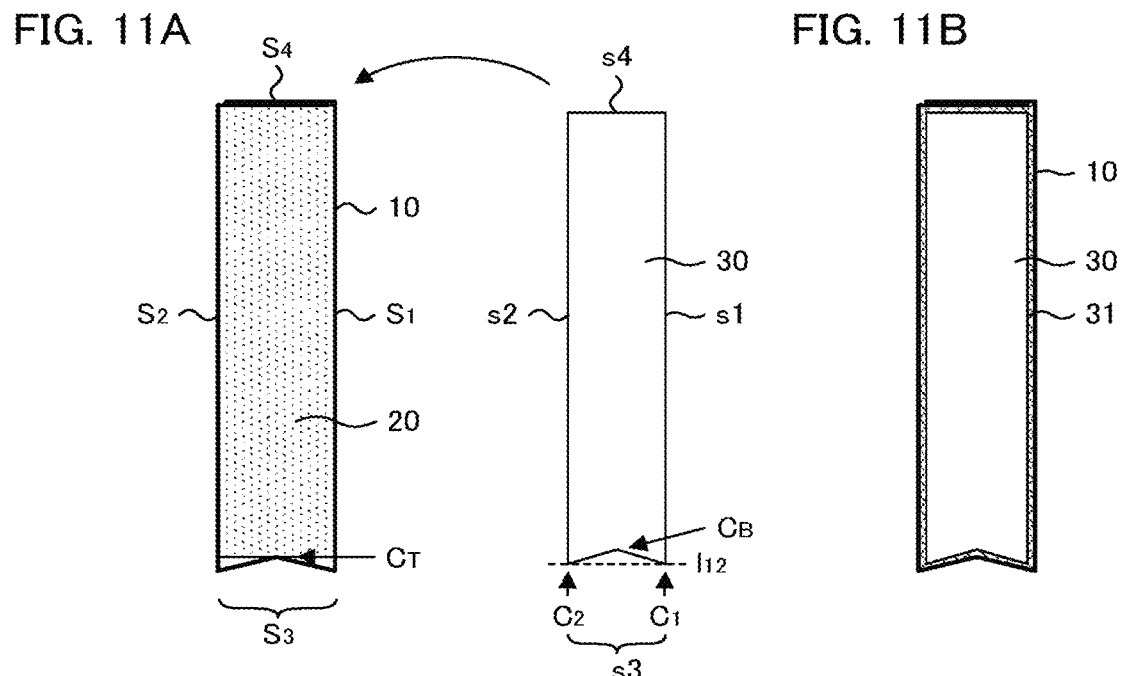

BATTERY CASE AND BATTERY

TECHNICAL FIELD

The present disclosure relates to a battery case and a battery.

BACKGROUND ART

A battery includes an electrode body, and an outer package for storing the electrode body. For example, Patent Literature 1 discloses a stacked battery comprising a laminate type outer package. Also, Patent Literature 1 discloses that a pressing member that presses a laminated electrode body in an inner direction of the battery is arranged on at least one of the peripheral surfaces of the laminated electrode body.

CITATION LIST

Patent Literature

Patent Literature 1: Japanese Patent Application Laid-Open (JP-A) No. 2009-181897

SUMMARY OF DISCLOSURE

Technical Problem

For example, when a pressing member is arranged as in Patent Literature 1, volume energy density of a battery tends to degrade. The present disclosure has been made in view of the above circumstances, and a main object thereof is to provide a battery case with which excellent volume energy density is obtained.

Solution to Problem

The present disclosure provides a battery case for storing an electrode body, the battery case including: a hollow structure; the hollow structure includes a first surface, a second surface facing the first surface, a third surface connecting the first surface and the second surface, and a fourth surface facing the third surface; and in a side view of an axis direction of the hollow structure, when $B_1$ designates a boarder part between the third surface and the first surface, $B_2$ designates a boarder part between the third surface and the second surface, and $L_{12}$ designates a line segment connecting the $B_1$ and the $B_2$, the third surface includes a convex structure of which top is positioned closer to the fourth surface side compared to the $L_{12}$.

According to the present disclosure, the third surface includes the specified convex structure, and thus a battery case with which excellent volume energy density is obtained may be achieved.

In the disclosure, the electrode body may include a fifth surface, a sixth surface facing the fifth surface, a seventh surface connecting the fifth surface and the sixth surface, and an eighth surface facing the seventh surface;

and positional relations of the fifth surface, the sixth surface, the seventh surface, and the eighth surface may respectively correspond to positional relations of the first surface, the second surface, the third surface, and the fourth surface.

In the disclosure, when $H_{C1}$ designates a distance between a position in the third surface closest to the fourth surface, and the fourth surface, and $H_E$ designates a distance between the seventh surface and the eighth surface, the $H_{C1}$ and the $H_E$ may satisfy $H_{C1} \leq H_E$.

In the disclosure, when $H_{C2}$ designates a distance between a position in the third surface farthest from the fourth surface, and the fourth surface, and $H_E$ designates a distance between the seventh surface and the eighth surface, the $H_{C2}$ and the $H_E$ may satisfy $H_{C2} \geq H_E$.

In the disclosure, when $W_C$ designates a distance between the first surface and the second surface, and $W_E$ designates a distance between the fifth surface and the sixth surface, the $W_C$ and the $W_E$ may satisfy $W_C \leq W_E$.

The present disclosure provides a battery comprising an electrode body and a battery case for storing the electrode body; wherein the battery case includes a hollow structure; the hollow structure includes a first surface, a second surface facing the first surface, a third surface connecting the first surface and the second surface, and a fourth surface facing the third surface; in a side view of an axis direction of the hollow structure, when $B_1$ designates a boarder part between the third surface and the first surface, $B_2$ designates a boarder part between the third surface and the second surface, and $L_{12}$ designates a line segment connecting the $B_1$ and the $B_2$, the third surface includes a convex structure of which top is positioned closer to the fourth surface side compared to the $L_{12}$; the electrode body includes a fifth surface, a sixth surface facing the fifth surface, a seventh surface connecting the fifth surface and the sixth surface, and an eighth surface facing the seventh surface; positional relations of the fifth surface, the sixth surface, the seventh surface, and the eighth surface respectively correspond to positional relations of the first surface, the second surface, the third surface, and the fourth surface; the fourth surface in the battery case contacts the eighth surface in the electrode body; and the top of the third surface in the battery case contacts the seventh surface in the electrode body.

According to the present disclosure, the fourth surface in the battery case contacts the eighth surface in the electrode body, and a top of the third surface in the battery case contacts the seventh surface in the electrode body, and thus a battery with excellent volume energy density may be obtained.

In the disclosure, the first surface in the battery case may contact the fifth surface in the electrode body; and the second surface in the battery case may contact the sixth surface in the electrode body.

In the disclosure, the battery may further comprise a side surface case arranged in a side surface of the battery case.

In the disclosure, the side surface case may include a concave shape corresponding to the convex structure.

Advantageous Effects of Disclosure

The present disclosure exhibits an effect of providing a battery case with which excellent volume energy density is obtained.

BRIEF DESCRIPTION OF DRAWINGS

FIG. 10 is a schematic cross-sectional view exemplifying the electrode body in the present disclosure.

FIGS. 11A and 11B are schematic plan views exemplifying the side surface case in the present disclosure.

DESCRIPTION OF EMBODIMENTS

The battery case and the battery in the present disclosure will be hereinafter explained in details. Each drawing described as below is a schematic view, and the size and the shape of each portion are appropriately exaggerated in order to be understood easily. Further, in each drawing, hatchings or reference signs are appropriately omitted.

A. Battery Case

Figure 1:
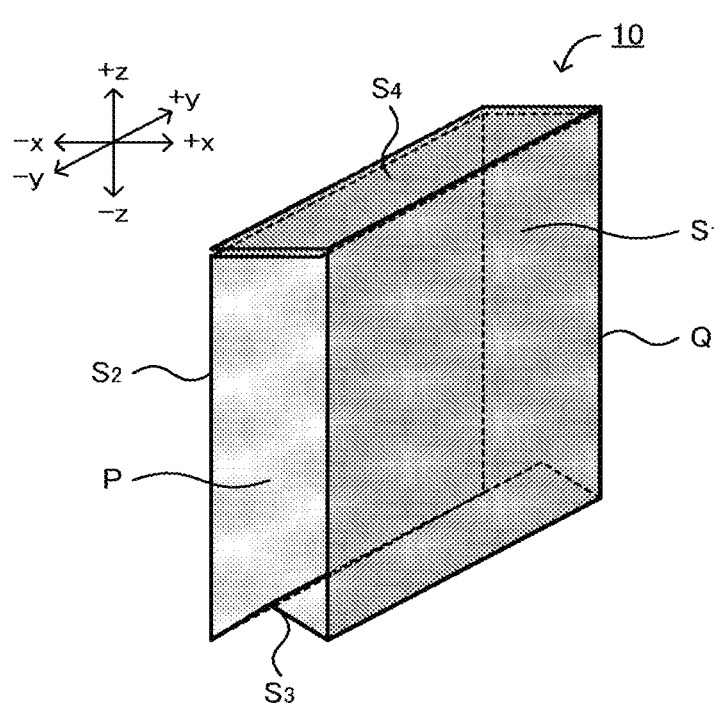
FIG. 1 is a schematic perspective view exemplifying the battery case in the present disclosure.

FIG. 1 is a schematic perspective view exemplifying the battery case in the present disclosure. Battery case 10 illustrated in FIG. 1 includes a hollow structure. This hollow structure includes first surface $S_1$, second surface $S_2$ facing the first surface $S_1$, third surface $S_3$ connecting the first surface $S_1$ and the second surface $S_2$, and fourth surface $S_4$ facing the third surface $S_3$. In FIG. 1, the first surface $S_1$ and the second surface $S_2$ face to each other in x axis direction, and the third surface $S_3$ and the fourth surface $S_4$ face to each other in z axis direction. Meanwhile, side surface P and side surface Q of the battery case 10 correspond to openings of the hollow structure, and they face to each other in y axis direction. In other words, the hollow structure shown in FIG. 1 has the y axis direction as the axis direction.

Figure 2:
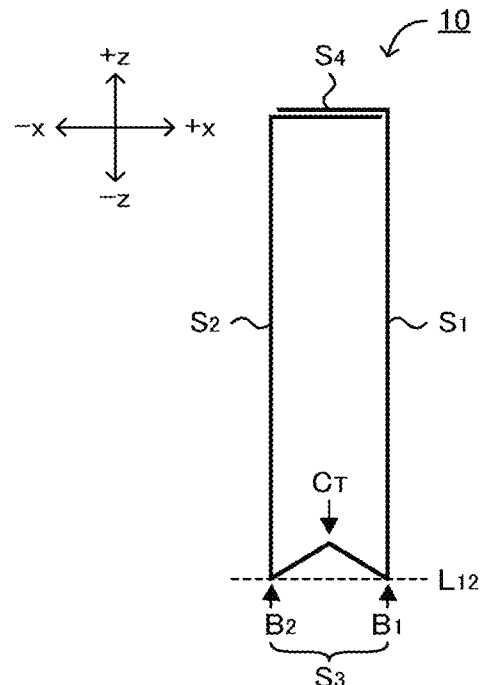
FIG. 2 is a schematic side view exemplifying the battery case in the present disclosure.

FIG. 2 is a schematic side view exemplifying the battery case in the present disclosure, which is a schematic side view of the hollow structure in the axis direction. As shown in FIG. 2, $B_1$ designates a boarder part between the third surface $S_3$ and the first surface $S_1$, $B_2$ designates a boarder part between the third surface $S_3$ and the second surface $S_2$, and $L_{12}$ designates a line segment connecting the $B_1$ and the $B_2$. The third surface $S_3$ includes a convex structure of which top Cr is positioned closer to the fourth surface $S_4$ side compared to the $L_{12}$.

Figure 3:
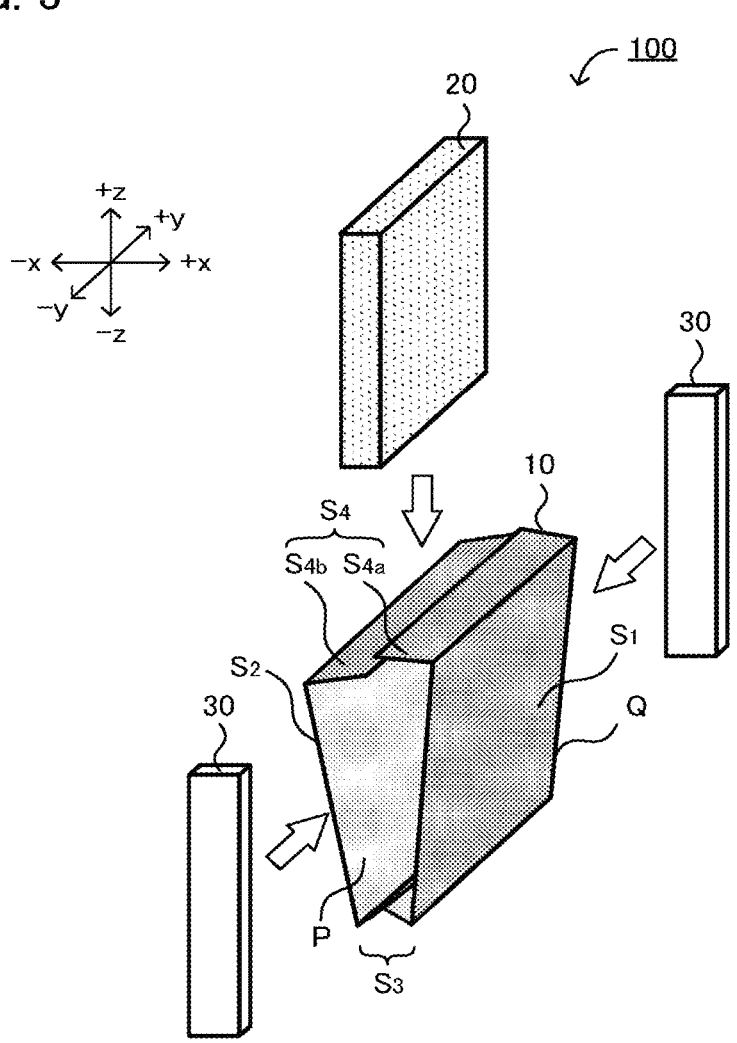
FIG. 3 is a schematic perspective view explaining the battery in the present disclosure.

According to the present disclosure, the third surface includes the specified convex structure, and thus a battery case with which excellent volume energy density is obtained may be achieved. Here, a battery provided with the battery case in the present disclosure will be explained with reference to FIG. 3. In FIG. 3, the fourth surface $S_4$ in the battery case 10 includes surface $S_{4a}$ extending from the first surface $S_1$, and surface $S_{4b}$ extending from the second surface $S_2$. The surface $S_{4a}$ and the surface Sab are arranged so as to overlap with each other in a plan view from the height direction (z axis direction). For example, by moving the surface $S_{4a}$ to +x direction while moving the surface $S_{4b}$ to −x direction, the battery case 10 bends, and there will be a space between the surface $S_{4a}$ and the surface $S_{4b}$ in the x axis direction. Through the space, electrode body 20 will be arranged inside the battery case 10 (in the hollow structure). After joining the surface $S_{4a}$ and the surface $S_{4b}$, the electrode body 20 is sealed by arranging a pair of side surface case 30 respectively in the side surface P and the side surface Q of the battery case 10.

Figures 4A, 4B:
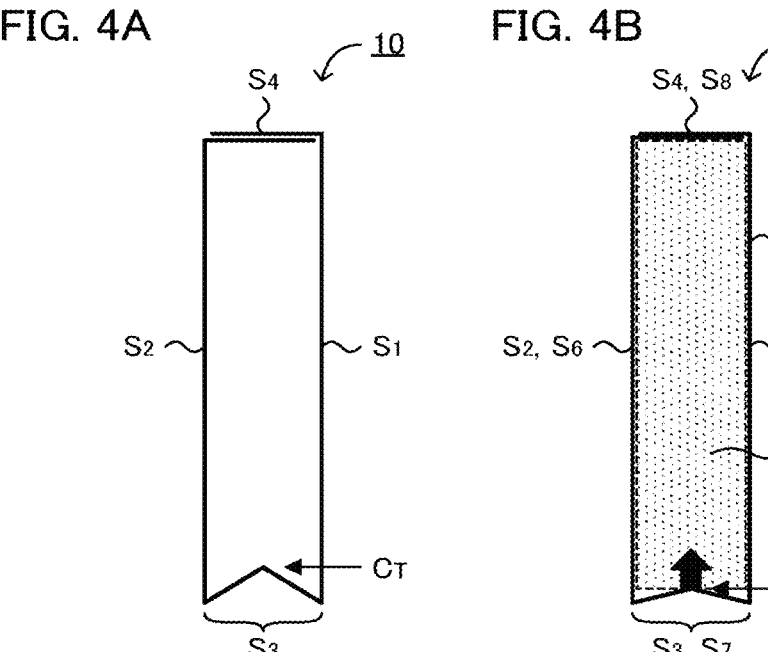
FIGS. 4A and 4B are schematic side views exemplifying the battery case and the battery in the present disclosure.

As shown in FIG. 4A, the third surface $S_3$ includes a convex structure with top Cr. As shown in FIG. 4B, when the electrode body 20 is arranged inside the battery case 10, the electrode body 20 will push the position of the top Cr to the direction further from the fourth surface $S_4$. As a result, pressing force shown as a black arrow will be applied to the electrode body 20, and thereby the position of the electrode body 20 will be fixed. In this manner, since the convex structure in the third surface $S_3$ is capable of fixing the position of the electrode body 20, arrangement of additional pressing member is not necessary. As a result, a battery case with which excellent volume energy density is obtained may be achieved. Also, a laminate-type outer package has been known as an outer package to be used for a battery. In the laminate-type outer package, a seal part formed by heat-sealing laminates is arranged so as to surround the main surface of an electrode body in a plan view. In this case, the seal part may be a factor to degrade the volume energy density. In contrast, in the battery case in the present disclosure, the side surface case may be arranged in the side surface of the battery case as described above. For this reason, it is not necessary to arrange the seal part to surround the main surface of the electrode body. From that point also, a battery case with which excellent volume energy density is obtained may be achieved.

The battery case in the present disclosure will be hereinafter explained in more details. The battery case in the present disclosure includes a hollow structure. As shown in FIG. 1, the hollow structure includes first surface $S_1$, second surface $S_2$ facing the first surface $S_1$, third surface $S_3$ connecting the first surface $S_1$ and the second surface $S_2$, and fourth surface $S_4$ facing the third surface $S_3$.

There are no particular limitations on the shape of each surface (the first surface, the second surface, the third surface or the fourth surface) in the battery case in a plan view, and examples thereof may include a square shape such as a foursquare shape and a rectangular shape. Also, the each surface may be a flat surface shape, may be a curved surface shape, and may be a shape combining two or more of flat surfaces. Also, the shape of the first surface in a plan view and the shape of the second surface in a plan view may be the same. Also, the shape of the fourth surface in a plan view and the shape of the third surface in a plan view may be the same. The area of the first surface is preferably larger than the area of the third surface. Similarly, the area of the first surface is preferably larger than the area of the fourth surface. Also, it is preferable that the first surface and the second surface are the surfaces facing the main surface of the electrode body (in the electrode body with a layered structure, the surface having the layering direction as a normal direction) when the electrode body is arranged inside the battery case.

Also, the battery case in the present disclosure is used for storing an electrode body. As shown in FIG. 4B, electrode body 20 includes fifth surface $S_5$, sixth surface $S_6$ facing the fifth surface $S_5$, seventh surface $S_7$ connecting the fifth surface $S_5$ and the sixth surface $S_6$, and eighth surface S& facing the seventh surface $S_7$. Positional relations of the fifth surface $S_5$, the sixth surface $S_6$, the seventh surface $S_7$, and the eighth surface $S_8$ respectively correspond to positional relations of the first surface $S_1$, the second surface $S_2$, the third surface $S_3$, and the fourth surface $S_4$. In specific, when the electrode body is arranged inside the battery case, the fifth surface $S_5$ will be a surface facing the first surface $S_1$. Likewise applies to the other surfaces, too.

Figures 5A, 5B:
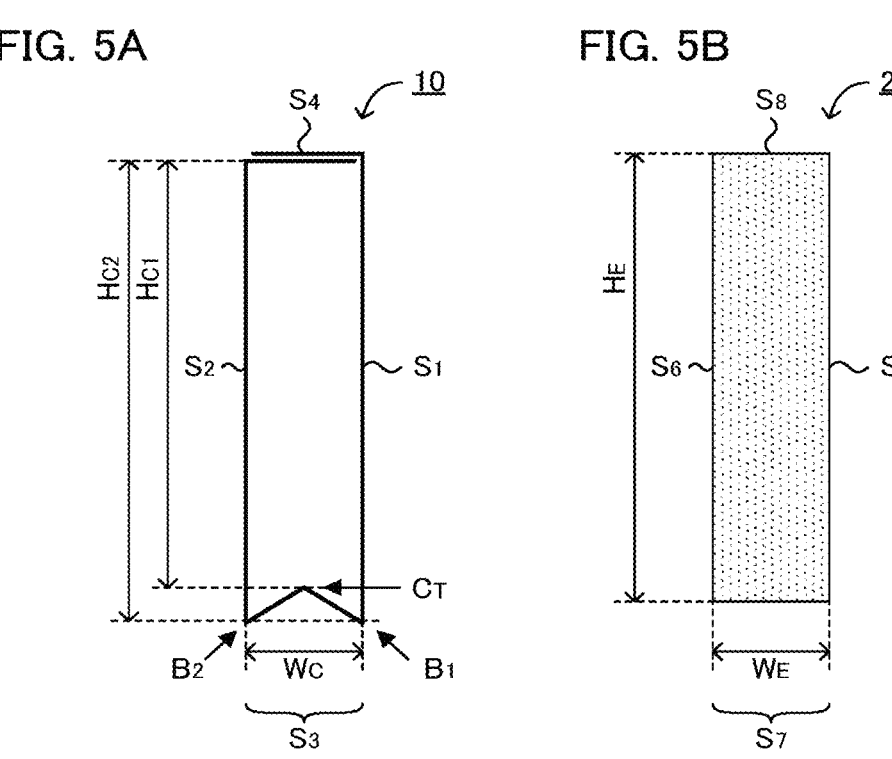
FIGS. 5A and 5B are schematic side views exemplifying the battery case and the electrode body in the present disclosure.

The size of the battery case is defined as follows. As shown in FIG. 5A, $H_{C1}$ designates a distance between a position in the third surface $S_3$ closest to the fourth surface $S_4$, and the fourth surface $S_4$. The Hoi is usually a distance in a direction (z axis direction in FIG. 2) connecting the third surface $S_3$ and the fourth surface $S_4$, which is an inner diameter not including the thickness of the third surface $S_3$ and the fourth surface $S_4$. The position in the third surface $S_3$ closest to the fourth surface $S_4$ is usually the position of top Cr. Also, as shown in FIG. 5A, $H_{C2}$ designates a distance between a position in the third surface $S_3$ farthest from the fourth surface $S_4$, and the fourth surface $S_4$. The $H_{C2}$ is usually a distance in a direction (z axis direction in FIG. 2) connecting the third surface $S_3$ and the fourth surface $S_4$, which is an inner diameter not including the thickness of the third surface $S_3$ and the fourth surface $S_4$. The position in the third surface $S_3$ farthest from the fourth surface $S_4$ is, for example, a position of boarder part $B_1$ or boarder part $B_2$. Also, as shown in FIG. 5A, $W_C$ designates a distance between the first surface $S_1$ and the second surface $S_2$. The $W_C$ is usually a distance in a direction (x axis direction in FIG. 2) connecting the first surface $S_1$ and the second surface $S_2$, which is an inner diameter not including the thickness of the first surface $S_1$ and the second surface $S_2$.

The size of the electrode body is defined as follows. As shown in FIG. 5B, $H_E$ designates a distance between the seventh surface $S_7$ and the eighth surface $S_8$. The $H_E$ is usually a distance in a direction (z axis direction in FIG. 2) connecting the seventh surface $S_7$ and the eighth surface $S_8$. Also, as shown in FIG. 5B, $W_E$ designates a distance between the fifth surface $S_5$ and the sixth surface $S_6$. The $W_E$ is usually a distance in a direction (x axis direction in FIG. 2) connecting the fifth surface $S_5$ and the sixth surface $S_6$.

The $H_{C1}$ and the $H_E$ preferably satisfy $H_{C1} \leq H_E$. In particular, when it is $H_{C1} < H_E$, the electrode body is easily fixed when the electrode body is arranged inside the battery case. The rate of $H_{C1}$ with respect to $H_E$ ($H_{C1}/H_E$) is, for example 0.90 or more. Meanwhile, the $H_{C1}/H_E$ is, for example, 1.00 or less, may be 0.99 or less, and may be 0.97 or less.

The $H_{C2}$ and the $H_E$ preferably satisfy $H_{C2} \geq H_E$. In particular, when it is $H_{C2} > H_E$, the electrode body is easily fixed when the electrode body is arranged inside the battery case. The rate of $H_{C2}$ with respect to $H_E$ ($H_{C2}/H_E$) is, for example, 1.00 or more, may be 1.01 or more, and may be 1.03 or more. Meanwhile, the $H_{C2}/H_E$ is, for example, 1.10 or less.

It is preferable that the $W_C$ and the $W_E$ satisfy $W_C \leq W_E$. In particular, when it is $W_C < W_E$, the electrode body will be easily fixed when the electrode body is arranged inside the battery case. The rate of the $W_C$ with respect to the $W_E$ ($W_C/W_E$) is, for example, 0.90 or more. Meanwhile, the $W_C/W_E$ is, for example, 1.00 or less, may be 0.99 or less, and may be 0.97 or less.

The difference ($H_{C2} - H_{C1}$) between the $H_{C2}$ and the $H_{C1}$ is, for example, 1 mm or more and 3 mm or less. Also, the rate ($H_{C2}/W_C$) of the $H_{C2}$ with respect to the $W_C$ is, for example, 1 or more and may be 5 or more. Meanwhile, there are no particular limitations on the upper limit of the $H_{C2}/W_C$.

Figures 6A, 6B, 6C, 6D, 7:
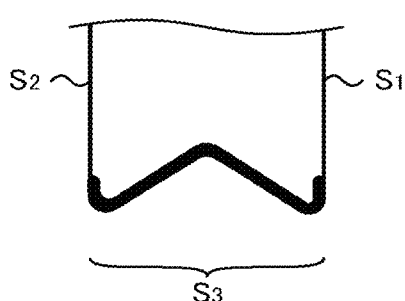
FIGS. 6A to 6D are schematic side views exemplifying the battery case in the present disclosure.
FIG. 7 is a schematic side view exemplifying the battery case in the present disclosure.

The third surface in the present disclosure includes a convex structure of which top is positioned closer to the fourth surface side compared to the line segment $L_{12}$. As shown in FIG. 6A, the top Cr may be a point (top point) in a side view. Also, as shown in FIG. 6B, the top Cr may be a curved surface in a side view. Also, as shown in FIG. 6C, the top Cr may be a flat surface in a side view. Also, as shown in FIG. 6D, the convex structure may include two or more of the top Cr.

As shown in FIG. 7, the thickness of the third surface may be larger than the thickness of the first surface, and the thickness of the second surface. When the thickness of the third surface is larger, the electrode body may be further pressed. The ratio of the thickness of the third surface with respect to the thickness of the first surface is, for example, 1.1 times, may be 1.5 times or more, and may be 2.0 times or more. Meanwhile, the ratio is, for example, 5.0 times or less. Also, the preferable range of the ratio of the thickness of the third surface with respect to the thickness of the second surface is the same as the preferable range of the ratio of the thickness of the third surface with respect to the thickness of the first surface. The thickness of each surface refers to the average thickness of each surface. Examples of the method for thickening the third surface may include a method of bonding a metal sheet for reinforcement.

Figure 8A:
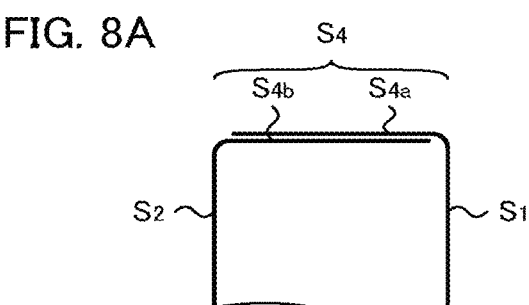
FIGS. 8A to 8C are schematic side views exemplifying the battery case in the present disclosure.
Figure 8C:
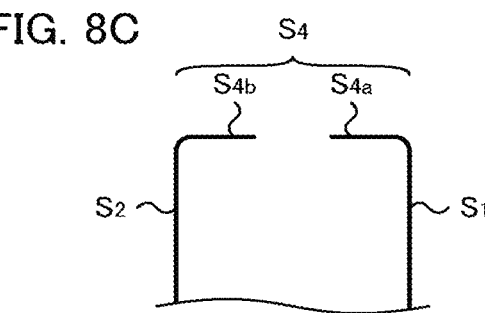
Figure 8B:
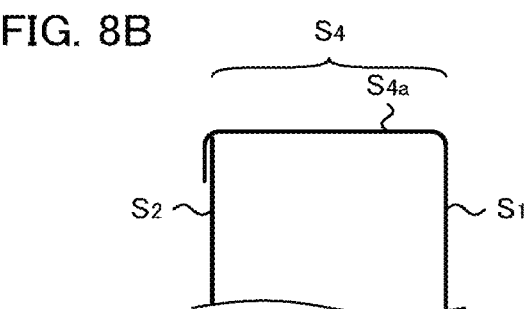

The fourth surface in the present disclosure is a surface arranged so as to face the third surface in the hollow structure. As shown in FIG. 8A, the fourth surface $S_4$ may include surface $S_{4a}$ extending from the first surface $S_1$, and surface $S_{4b}$ extending from the second surface $S_2$. In FIG. 8A, an over lapping part, where the surface $S_{4a}$ overlaps the surface $S_{4b}$, is arranged so as to face the third surface (not illustrated). Also, as shown in FIG. 8B, the fourth surface $S_4$ may include the surface $S_{4a}$ extending from the first surface $S_1$, but may not include the surface extending from the second surface $S_2$. In FIG. 8B, the edge of the surface $S_{4a}$ is arranged so as to overlap the second surface $S_2$. As shown in FIG. 8C, the fourth surface $S_4$ may include the surface $S_{4a}$ extending from the first surface $S_1$, and the surface Sab extending from the second surface $S_2$, but the surface $S_{4a}$ may not overlap the surface $S_{4b}$. In this case, the opening between the surface $S_{4a}$ and the surface $S_{4b}$ is preferably sealed by additional member. As shown in FIGS. 8A and 8B, the cross-section of the hollow structure, which is cut vertically in the axis direction, may be a closed cross-section. Meanwhile, as shown in FIG. 8C, the cross-section of the hollow structure, which is cut vertically in the axis direction, may be an open cross-section.

The battery case may or may not include a resin layer with thermal adhesiveness in the inner surface side (side where the electrode body will be stored) of the hollow structure. Also, the material for the battery case is not particularly limited, and examples thereof may include a metal such as aluminum and stainless steel. Each surface (the first surface, the second surface, the third surface and the fourth surface) configuring the hollow structure is preferably formed of one metal plate. Also, there are no particular limitations on the thickness of the battery case, and for example, it is 0.05 mm or more and may be 0.10 mm or more. Meanwhile, the thickness of the battery case is, for example, 0.50 mm or less, and may be 0.30 mm or less.

B. Battery

Figure 9:
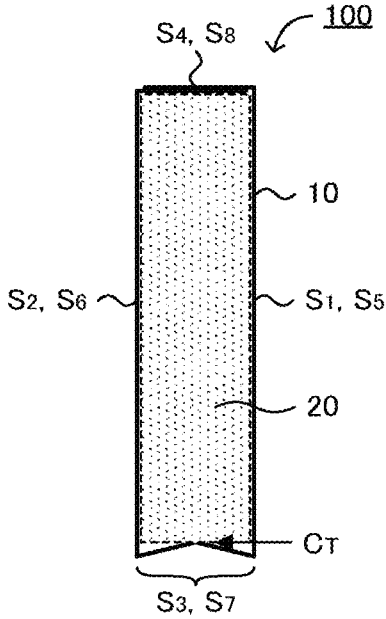
FIG. 9 is a schematic side view exemplifying the battery in the present disclosure.

FIG. 9 is a schematic side view exemplifying the battery in the present disclosure. Battery 100 illustrated in FIG. 9 includes electrode body 20, and battery case 10 for storing the electrode body 20. The fourth surface $S_4$ in the battery case 10 contacts the eighth surface S& in the electrode body 20. Also, the top Cr of the third surface $S_3$ in the battery case 10 contacts the seventh surface $S_7$ in the electrode body 20.

According to the present disclosure, the fourth surface in the battery case contacts the eighth surface in the electrode body, and a top of the third surface in the battery case contacts the seventh surface in the electrode body, and thus a battery with excellent volume energy density may be obtained.

1. Battery Case

The battery case in the present disclosure is a member for storing the electrode body. The battery case is in the same contents as those described in "A. Battery case" above; thus, the descriptions herein are omitted.

As shown in FIG. 9, the fourth surface $S_4$ in the battery case 10 contacts the eighth surface S& in the electrode body 20. The fourth surface $S_4$ may contact the eighth surface $S_8$ at a point or in the surface, in a side view of the axis direction of the hollow structure. Also, in FIG. 9, the top Cr of the third surface $S_3$ in the battery case 10 contacts the seventh surface $S_7$ in the electrode body 20. As shown in FIG. 5A described above, $H_{C1}$ designates a distance between a position in the third surface $S_3$ closest to the fourth surface $S_4$, and the fourth surface $S_4$. Similarly, $H_{C2}$ designates a distance between a position in the third surface $S_3$ farthest from the fourth surface $S_4$, and the fourth surface $S_4$. Also, as shown in FIG. 5B described above, $H_E$ designates a distance between the seventh surface $S_7$ and the eighth surface $S_8$. In the battery in the present disclosure, the $H_{C1}$ and the $H_E$ usually satisfy $H_{C1}=H_E$. Similarly, in the battery in the present disclosure, the $H_{C2}$ and the $H_E$ usually satisfy $H_{C2}>H_E$.

As shown in FIG. 9, the first surface $S_1$ in the battery case 10 preferably contacts the fifth surface $S_5$ in the electrode body 20. The first surface $S_1$ may contact the fifth surface $S_5$ at a point or in the surface, in a side view of the axis direction of the hollow structure, but the latter is preferable. Also, the second surface $S_2$ in the battery case 10 preferably contacts the sixth surface $S_6$ in the electrode body 20. The second surface $S_2$ may contact the sixth surface $S_6$ at a point or in the surface, in a side view of the axis direction of the hollow structure, but the latter is preferable. As shown in FIG. 5A described above, $W_C$ designates a distance between the first surface $S_1$ and the second surface $S_2$. Also, as shown in FIG. 5B described above, $W_E$ designates a distance between the fifth surface $S_5$ and the sixth surface $S_6$. In the battery in the present disclosure, the $W_C$ and the $W_E$ usually satisfy $W_C=W_E$.

2. Electrode Body

The electrode body in the present disclosure is a part where the battery reactions occur. The electrode body 20 shown in FIG. 10 includes cathode active material layer 21, anode active material layer 22, and electrolyte layer 23 arranged between the cathode active material layer 21 and the anode active material layer 22. A set of the cathode active material layer 21, the electrolyte layer 23, and the anode active material layer 22 may be referred to as a power generating unit X. Also, the electrode body 20 includes cathode current collector 24 on the surface of the cathode active material layer 21 that is opposite to the electrolyte layer 23, and includes anode current collector 25 on the surface of the anode material layer 22 that is opposite to the electrolyte layer 23. A set of one or two or more of the power generating unit X and two or more of the current collectors (cathode current collector and anode current collector) may be referred to as a power generating element Y.

Also, as shown in FIG. 10, the electrode body 20 may include first protective layer 26a that protects the side surface of the power generating element Y. In FIG. 10, the first protective layer 26a is arranged respectively in the both side surfaces of the power generating element Y. Although not illustrated in particular, the first protective layer may be arranged in just one side surface of the power generating element Y. Also, in FIG. 10, in the side surface of the power generating element Y, the first protective layer 26a is arranged in the entire region of the thickness direction Dr. Although not illustrated in particular, the first protective layer may be arranged just partially in the thickness direction.

Also, as shown in FIG. 10, the electrode body 20 may include second protective layer 26b that protects the main surface (the surface in which the thickness direction Dr is a normal direction) of the power generating element Y. In FIG. 10, the second protective layer 26b is arranged respectively in the both main surfaces of the power generating element Y. Although not illustrated in particular, the second protective layer may be arranged in just one main surface of the power generating element Y. Also, the second protective layer may be arranged so as to overlap at least a part of the power generating element Y in a plan view in the thickness direction. Further, the second protective layer may be arranged so as to entirely cover the power generating element Y.

The cathode active material layer contains at least a cathode active material, and may further contain at least one of a conductive material, an electrolyte and a binder. Examples of the cathode active material may include an oxide active material such as $LiNi_{1/3}Mn_{1/3}Co_{1/3}O_2$. Examples of the conductive material may include a carbon material. Examples of the electrolyte may include a solid electrolyte and an electrolyte solution (liquid electrolyte). Examples of the solid electrolyte may include an inorganic solid electrolyte such as a sulfide solid electrolyte, an oxide solid electrolyte and a halide solid electrolyte; a gel electrolyte and a polymer electrolyte. Examples of the liquid electrolyte may include a liquid electrolyte formed by dissolving Li salt such as $LiPF_6$ in a carbonate-based solvent. Examples of the binder may include a fluorine-based binder such as PVDF. Examples of the cathode current collector may include Al, SUS, and Ni.

The anode active material layer contains at least an anode active material, and may further contain at least one of a conductive material, an electrolyte and a binder. Examples of the anode active material may include a Si-based active material such as a simple substance of Si, a Si alloy and a Si oxide, a graphite-based active material such as graphite, and an oxide-based active material such as lithium titanate. The conductive material, the electrolyte and the binder in the anode active material layer are in the same contents as those described for the cathode active material layer above. Examples of the anode current collector may include Cu, SUS, and Ni.

The electrolyte layer contains at least an electrolyte, and may further contain a binder. The electrolyte and the binder are in the same contents as those described for the cathode active material layer above. When the electrolyte layer contains a solid electrolyte, such a battery is generally called an all solid state battery. The battery in the present disclosure may be an all solid state battery. When the electrolyte layer contains an electrolyte solution, the electrolyte layer may be a layer formed by impregnating a separator with the electrolyte solution.

When the electrode body includes a plurality of the power generating unit, they may be connected in series and may be connected in parallel. Also, the power generating element in the electrode body usually has a layered structure in which each layer described above is layered. The power generating unit may have a sheet-type layered structure, and may have a wound-type layered structure. Also, the protective layer is preferably an insulating layer. The reason therefor is to inhibit occurrence of short circuit. Examples of the material for the protective layer may include a resin.

3. Side Surface Case

The battery in the present disclosure may include a side surface case arranged in the side surface of the battery case. As described above, the side surface of the battery case corresponds to the opening of the hollow structure. The battery in the present disclosure may include the side surface case in one side surface out of two side surfaces of the battery case, and may include the side surface case respectively in the two side surfaces. Incidentally, depending on the size of the battery case, the side surface case may not be arranged in the side surface of the battery case, but a sealing material such as a resin may be used to seal the battery case.

As shown in FIG. 11A, the electrode body 20 is arranged inside the battery case 10 (in the hollow structure), and then the side surface case 30 is arranged in the side surface of the battery case 10. On this occasion, resin layer 31 with adhesive properties is arranged around the side surface case 30. Thereby, as shown in FIG. 11B, the side surface of the battery case 10 is sealed by the side surface case 30 and the resin layer 31. The shape of the side surface case in a plan view is not particularly limited, but is preferably a shape similar to the shape of the side surface of the battery case 10, as shown in FIG. 11A.

As shown in FIG. 11A, the side surface case 30 may include a concave shape corresponding to the convex structure of the battery case 10. The side surface case 30 shown in FIG. 11A includes first side s1, second side s2 facing the first side s1, third side s3 connecting the first side s1 and the second side s2, and fourth side s4 facing the third side s4, in a plan view. Positional relations of the first side s1, the second side s2, the third side s3, and the fourth side s4 respectively correspond to the positional relations of the first surface $S_1$, the second surface $S_2$, the third surface $S_3$, and the fourth surface $S_4$ in the battery case 10. In the side surface case 30, $C_1$ designates an intersection point of the third side s3 and the first side s1, $C_2$ designates an intersection point of the third side s3 and the second side s2, and 112 designates a line segment connecting the $C_1$ and the $C_2$. The third side s3 may include a concave shape of which bottom part CB is positioned closer to the fourth side s4 side compared to the line segment 112.

The side surface case may include a cut-out part where current collecting terminals (cathode terminal and anode terminal) may be arranged. Also, the side surface case itself may be the current collecting terminal. Also, there are no particular limitations on the material and the thickness of the side surface case, and they are equivalent to the material and the thickness of the battery case described above.

4. Battery

The battery in the present disclosure includes at least the electrode body and the battery case, and preferably further includes the side surface case. Meanwhile, it is preferable that the battery in the present disclosure does not include a spacer inside the battery case.

The battery in the present disclosure is typically a lithium ion secondary battery. The application of the battery is not particularly limited, and examples thereof may include a power source for vehicles such as hybrid electric vehicles (HEV), plug-in hybrid electric vehicles (PHEV), battery electric vehicles (BEV), gasoline-fueled automobiles and diesel powered automobiles. In particular, it is preferably used as a power source for driving hybrid electric vehicles, plug-in hybrid electric vehicles, or battery electric vehicles. Also, the battery in the present disclosure may be used as a power source for moving bodies other than vehicles (such as rail road transportation, vessel and airplane), and may be used as a power source for electronic products such as information processing equipment.

The method for producing the battery in the present disclosure is not particularly limited, and examples thereof may include a method comprising an arranging step of arranging the electrode body inside the battery case (in the hollow structure), and a side surface sealing step of sealing the side surface of the battery case.

In the arranging step, as shown in FIG. 3 described above, for example, by moving the surface $S_{4a}$ to the +x direction while moving the surface $S_{4b}$ to the –x direction, the battery case 10 may be bent to generate a space between the surface $S_{4a}$ and the surface $S_{4b}$ in the x axis direction. Through the space, electrode body 20 will be arranged inside the battery case 10 (in the hollow structure).

In the arranging step, the battery case and the electrode body preferably have the size relations as follows. Incidentally, the size relations as follows are the relations before arranging the electrode body inside the battery case. Here, as shown in FIG. 5A described above, $H_{C1}$, $H_{C2}$, and $W_C$ are defined regarding the size of the battery case. Similarly, as shown in FIG. 5B described above, $H_E$ and $W_E$ are defined regarding the size of the electrode body. Also, each of the size of the battery case and the size of the electrode body usually includes manufacturing error. The upper limit of the acceptable range of the manufacturing error is expressed as MAX, and the lower limit thereof is expressed as MIN. $H_{C1-MAX}$ and $H_{E-MIN}$ preferably satisfy $H_{C1-MAX} \leq H_{E-MIN}$. Also, $H_{C2-MIN}$ and $H_{E-MAX}$ preferably satisfy $H_{C2-MIN} \geq H_{E-MAX}$. Also, $W_{C-MAX}$ and $W_{E-MIN}$ preferably satisfy $W_{C-MAX} \leq W_{E-MIN}$.

In the side surface sealing step, as shown in FIG. 11B described above, the side surface of the battery case 10 may be sealed by the side surface case 30 and the resin layer 31.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SIGNS LIST 10 battery case
20 electrode body
30 side surface case
100 battery

What is claimed is:

1. A battery case for storing an electrode body,
the battery case comprising: a hollow structure;
the hollow structure includes a first surface, a second surface facing the first surface, a third surface connecting the first surface and the second surface, and a fourth surface facing the third surface; and
in a side view of an axis direction of the hollow structure, when $B_1$ designates a boarder part between the third surface and the first surface, $B_2$ designates a boarder part between the third surface and the second surface, and $L_{12}$ designates a line segment connecting the $B_1$ and the $B_2$, the third surface includes a convex structure of which top is positioned closer to the fourth surface side compared to the $L_{12}$, and
the fourth surface comprises a surface $S_{4a}$ extended from the first surface;

wherein a thickness of the third surface is larger than a thickness of the first surface, and a thickness of the second surface.

2. The battery case according to claim 1, wherein the electrode body includes a fifth surface, a sixth surface facing the fifth surface, a seventh surface connecting the fifth surface and the sixth surface, and an eighth surface facing the seventh surface; and positional relations of the fifth surface, the sixth surface, the seventh surface, and the eighth surface respectively correspond to positional relations of the first surface, the second surface, the third surface, and the fourth surface.

3. The battery case according to claim 2, wherein when $H_{C1}$ designates a distance between a position in the third surface closest to the fourth surface, and the fourth surface, and $H_E$ designates a distance between the seventh surface and the eighth surface, the $H_{C1}$ and the $H_E$ satisfy $H_{C1} \leq H_E$.

4. The battery case according to claim 2, wherein when $H_{C2}$ designates a distance between a position in the third surface farthest from the fourth surface, and the fourth surface, and $H_E$ designates a distance between the seventh surface and the eighth surface, the $H_{C2}$ and the $H_E$ satisfy $H_{C2} \geq H_E$.

5. The battery case according to claim 2, wherein when $W_C$ designates a distance between the first surface and the second surface, and $W_E$ designates a distance between the fifth surface and the sixth surface, the $W_C$ and the $W_E$ satisfy $W_C \leq W_E$.

6. A battery comprising an electrode body and a battery case for storing the electrode body; wherein the battery case includes a hollow structure;

the hollow structure includes a first surface, a second surface facing the first surface, a third surface connecting the first surface and the second surface, and a fourth surface facing the third surface;

in a side view of an axis direction of the hollow structure, when $B_1$ designates a boarder part between the third surface and the first surface, $B_2$ designates a boarder part between the third surface and the second surface, and $L_{12}$ designates a line segment connecting the $B_1$ and the $B_2$, the third surface includes a convex structure of which top is positioned closer to the fourth surface side compared to the $L_{12}$;

the electrode body includes a fifth surface, a sixth surface facing the fifth surface, a seventh surface connecting the fifth surface and the sixth surface, and an eighth surface facing the seventh surface;

positional relations of the fifth surface, the sixth surface, the seventh surface, and the eighth surface respectively correspond to positional relations of the first surface, the second surface, the third surface, and the fourth surface;

the fourth surface in the battery case contacts the eighth surface in the electrode body;

the top of the third surface in the battery case contacts the seventh surface in the electrode body, and the fourth surface comprises a surface $S_{4a}$ extended from the first surface;

wherein a thickness of the third surface is larger than a thickness of the first surface, and a thickness of the second surface.

7. The battery according to claim 6, wherein the first surface in the battery case contacts the fifth surface in the electrode body; and the second surface in the battery case contacts the sixth surface in the electrode body.

8. The battery according to claim 6, further comprising a side surface case arranged in a side surface of the battery case, and the battery case and the side surface case are different members.

9. The battery according to claim 8, wherein the side surface case includes a concave shape corresponding to the convex structure.

10. The battery case according to claim 1, wherein the fourth surface comprises a surface $S_{4b}$ extended from the second surface.

11. The battery according to claim 6, wherein the fourth surface comprises a surface $S_{4b}$ extended from the second surface.

12. The battery case according to claim 10, wherein the surface S4$a$ and the surface $S_{4b}$ are arranged so as to overlap with each other, in a plan view from a direction connecting the third surface $S_3$ and the fourth surface $S_4$.

13. The battery according to claim 11, wherein the surface S4$a$ and the surface $S_{4b}$ are arranged so as to overlap with each other, in a plan view from a direction connecting the third surface $S_3$ and the fourth surface $S_4$.

14. The battery case according to claim 1, wherein the first surface, the second surface, the third surface, and the fourth surface are formed of one metal plate, and the third surface further comprises a bonded metal sheet for reinforcement.

15. The battery according to claim 6, wherein the first surface, the second surface, the third surface, and the fourth surface are formed of one metal plate, and the third surface further comprises a bonded metal sheet for reinforcement.

\* \* \* \* \*